April 1, 1969   F. G. WEEDEN ET AL   3,435,853

METHOD AND MEANS FOR PREVENTING LINER CONTRACTION

Filed Jan. 25, 1967

Frank G. Weeden
Gerald R. Pope
Willard L. Petrosky
Burliegh R. Murphree
INVENTORS BY James F. Weiler
William A. Stout
Paul L. DeVerter II
Burliegh R. Dobie Jr.
Henry W. Hope
ATTORNEYS United States Patent Office 3,435,853
Patented Apr. 1, 1969

3,435,853
METHOD AND MEANS FOR PREVENTING LINER CONTRACTION
Frank G. Weeden, Gerald R. Pope, Willard L. Petrosky, and Burleigh R. Murphee, Houston, Tex., assignors to John L. Doré Co., Houston, Tex., a corporation of Texas
Filed Jan. 25, 1967, Ser. No. 611,668
Int. Cl. F16l 9/14
U.S. Cl. 138—147                4 Claims

ABSTRACT OF THE DISCLOSURE

The present invention relates to a device and method for prevention of liner slippage in lined pipes, tubing, vessels or the like. It utilizes tab portions of the liner bent around the edges of the lined equipment and the retention of these tabs by the utilization of a bar.

Cross references to related application

Application No. 523,387, filed on Jan. 27, 1966, and entitled, "Lined Vessel," and now abandoned, relates to a portion of this application involving the structure used to support the liner as disclosed herein.

Background of the invention

The present invention relates to the lining of pipe, vessels and the like and more particularly, to means to prevent liner slippage or creep after the lining has been installed.

It is, of course, common and well-known to line pipe, vessels, tubing and like pieces of equipment or apparatus with various substances such as Teflon. These linings provide protection for the equipment or apparatus against deleterious effects that may result to the equipment or apparatus due to its coming into contact with various substances and experiencing varied temperatures. A problem that often occurs in lined equipment is that the liner will tend to slide or creep relative to the equipment to which it is attached. This is especially true around pipe or vessel flanges. The liner tends to contract into the pipe or vessel and away from the flange. Such inward movement of the liner will result in a wrinkling of the liner which will in turn, cause stress cracking in the liner.

Summary of the invention

The present invention relates to method and apparatus utilized to prevent liner slippage or wrinkling by providing tabs in the ends of the liner which are pulled over the edges of the lined equipment and retained in such a position. In this manner, the present invention prevents the inward creep of the liner, both axially and radially, and the resultant wrinkling and stress cracking.

It is, therefore, an object of the present invention to provide a method and apparatus to prevent liner creep at the edges of lined vessels, pipe and the like.

It is a still further object of the present invention to provide method and apparatus to prevent liner slippage by securing tabs formed in the edge portions of the liner against movement relative to the liner.

An additional object is to utilize a retainer band to force these tabs against the sides of the lined piece of equipment to prevent the tabs from returning to their original shape.

Other and further objects, features and advantages will be apparent from the following description of a presently preferred embodiment of the invention given for the purpose of disclosure, taken in conjunction with the accompanying drawings.

Brief description of the drawings

In the drawings, like character references designate like parts throughout the several views, which are as follows.

Description of the preferred embodiment

The present invention will be described as utilized on a vessel. It is to be understood, however, that it may be used with any lined piece of equipment or apparatus having edge portions over which tabs may be extended in the manner herein set forth. For purposes of this application and the appended claims, therefore, the word "vessel" is intended to include pipes, tubing, bowls, dish-shaped heads, and like pieces of equipment.

Figure 1:
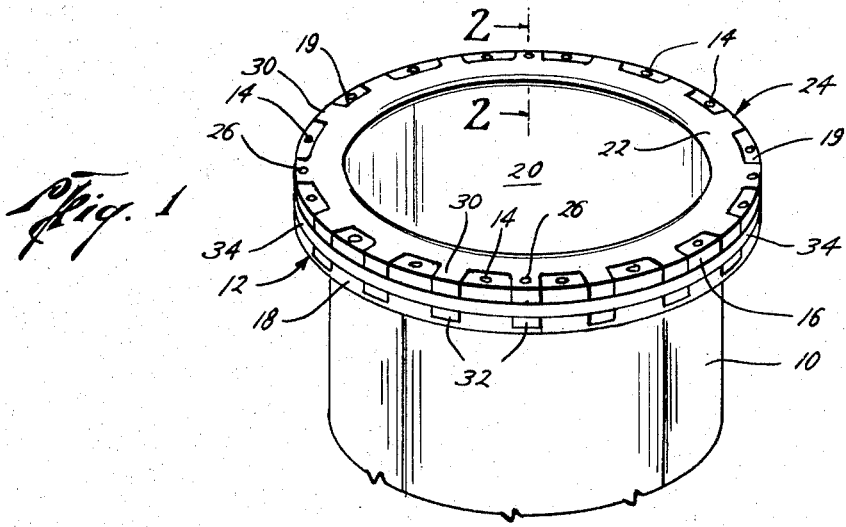
FIGURE 1 is a perspective view of the present invention utilized on a pipe or cylindrical vessel having a mating flange.

Turning now to the drawing, there is shown in FIGURE 1 a cylindrical vessel 10 having a radially extended joining flange generally indicated at 12. Bolt holes 14 are located in the flange and extend therethrough for receiving attaching means for attachment of additional cylindrical members 10 or a top or like pieces of equipment in a well-known manner.

The flange 12 has an upper or mating surface 16 and an outer peripheral surface 18. The surface 16 joins or mates with a similar mating surface on other equipment when fastened to the vessel 10 to form a tight seal. Generally, a gasket 19 member will be interposed between mating surfaces to form a better seal.

On the interior of the vessel is the lining 20. The lining has an edge or mating surface 22 which is substantially even with the mating surface 16 of the flange 12. The lining 20 may be any suitable substance such as Teflon depending on the material to be contained in or passed through the vessel or the process to be performed therein. The lining in this embodiment is not physically bonded or attached to the vessel 10 with the exception of the attaching of the edge portions.

Figure 2:
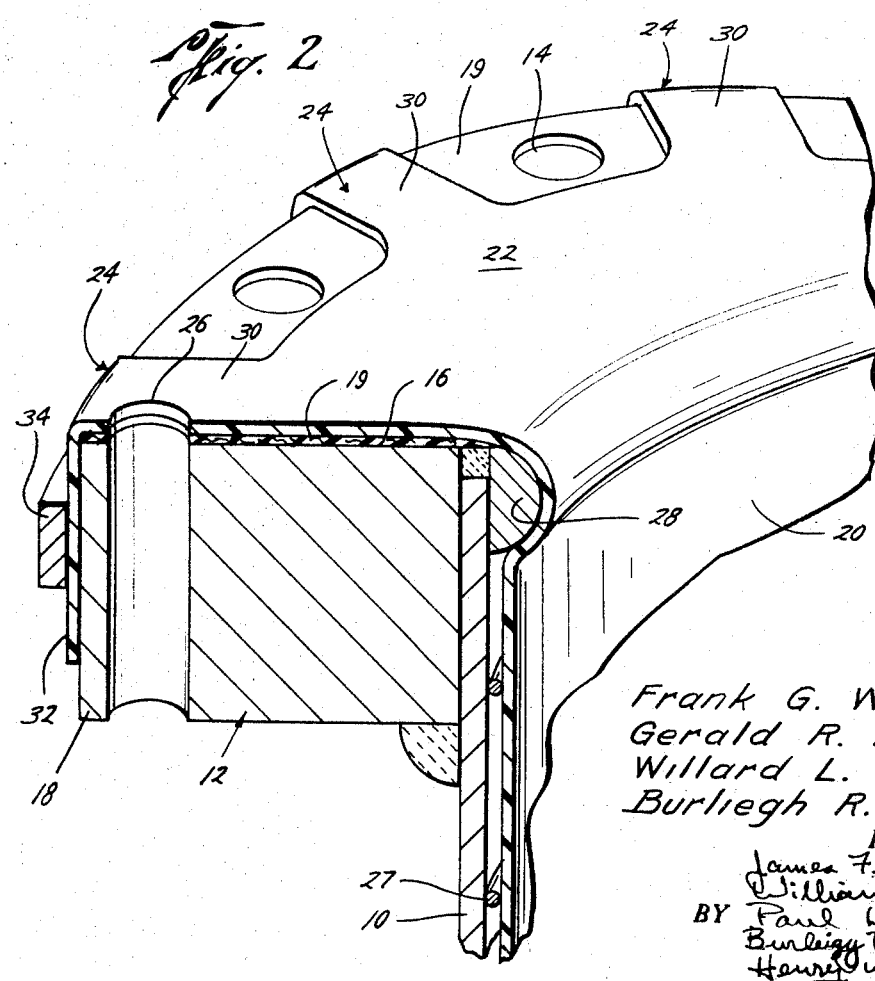
FIGURE 2 is a section view taken along section lines 2—2 of FIGURE 1 and showing the extension tabs of the present invention.

With reference to FIGURE 2, grid or wire mesh 27 is placed between the liner 20 and the vessel 10 to compensate for possible liner expansion brought about, for example, by high temperatures and pressures. The grid 27, of course, consists of vertical members, as well as the horizontal members shown. Due to the use of the grid 27, rather than expanding randomly and slipping within the vessel 10, the liner 20 expands into the valleys formed by the grid and thereby assumes the contour formed by the vessel walls and the overlying grid. In this manner, uniform protuberances are formed in the liner. The grid further provides an anchoring effect for the liner, thereby eliminating the slipping of the liner.

The half-round 28 is attached adjacent the edge formed at the juncture of the vessel 10 and flange 12. This half-round provides additional grid means and also provides a curved surface at the edge of the vessel about which the liner may expand, rather than a relatively sharp edge, thereby preventing abrupt folding and splitting at the edge.

Both the function and the structure of the grid 27 and the half-round 28 are more fully set forth in the copending related application named at the beginning.

Returning now to the liner 20, tabs 24 are formed in the edge portion as is shown in FIGURES 1 and 2. These tabs have portions 30 which extend radially outwardly from the edge of the liner and downwardly extending portions 32. The upper surfaces of the tab portions 30 form a part of the mating surface 22 of the liner.

Bolt holes 26 are shown located in the portions 30 of some of the tabs 24. Although bolt holes generally are not located in the tabs since this may weaken the tabs, satisfactory performance may be achieved with the holes so located.

A retention band 34 extends tightly around the outer peripheral surface 18 of the flange 12. As can be seen in FIGURES 1 and 2, the retention band 34 contacts the downwardly extending portions 32 of the tabs 24.

Referring now to the assembly and operation of the present invention, the material that makes up the liner 20 is formed by conventional methods into a cylindrical body in the proper size to fit within the vessel 10. The cylindrical liner is then inserted into the vessel but is of such a length that a portion thereof extends out of either end of the vessel. These exposed portions of the liner are cut to form the tabs 24. The tabs 24 are heated and, while in their heated condition, are flared radially outwardly. The mating surface 22 is a part of this flared portion. The outermost ends of the tabs are bent around the outer edge of flange 12 to form the downwardly extending tab portions 32. The retention band 34 is placed around the outer peripheral surface 18 of the flange 12 and is tightly secured by any suitable band tightening means. The retention band 34 is tightened into the tab portion 32 to retain the tab 24 and prevent it from slipping.

The materials used in lining such vessels generally have excellent plastic memory. Accordingly, the tabs 24 have a tendency to return to the position in which they were prior to their being flared. When another mating flange (not shown) is attached to the flange 12, the mating surfaces 16 and 22 mate with a like mating surface or surfaces on the other flange. This contact prevents the tabs from returning to their original position.

When the opposed flange is removed, however, there is nothing to prevent this return. The natural tendency of the liner itself is to contract or shrink in a lengthwise direction which is a further inducement for the flare or the tabs 24 to shrink or contract radially. Should this occur, there will be an excess of material formed which will create folds and stress cracks at the crests of the fold. The use of the retention band in the present invention overcomes the natural tendency of the tabs to return and prevents this creep which would form cracks in the liner as well as destroy the proper configuration of the liner along its edge.

The present invention may, of course, be utilized on vessels or the like having no flange unlike that shown in the preferred embodiment. In such case, the outer surface of the vessel would receive the downwardly extending tab portion 32, it being the surface opposite the lined surface. The portions 30 of the tabs 24 and the mating or flared area 22 would, of course, have to be dimensioned to fit since there would be little or no surface 16.

As can be seen, therefore, the present invention achieves the objectives set forth in the outset. Method and apparatus have been devised for attaching a liner to a vessel or the like in such a manner that the natural tendency of the liner to return to its pre-flared condition or to draw up or shrink is overcome. A simple and inexpensive means has been provided which insures conformation of the liner with the vessel within which it is installed. The present invention, furthermore, prevents any significant change in the configuration of the liner and its position relative to the vessel when mating pieces of apparatus have been removed, whereby there is no mating surface keeping the liner in place.

The present invention, therefore, is well adapted to carry out the objects and attain the ends and advantages mentioned as well as others inherent therein.

What is claimed is:

1. A vessel having a lined surface and an opposite surface and including edge portions, the improvement comprising:
    means for the prevention of liner contraction relative to the vessel including,
    liner tabs extending around said edge portions and along said opposite surface, and
    retention means for preventing movement of the tabs around the edge portions from said opposite surface.

2. The invention of claim 1 wherein said retention means comprises:
    a band urging said tabs against the opposite surface of said vessel.

3. The invention of claim 2 wherein the edge portions are further defined as including:
    an outwardly extending flange comprised of,
    a mating surface, and
    an outer peripheral surface,
    said tabs extending around the mating surface and along the outer surface, and
    the retention band extending around said outer peripheral surface urging the tabs against said outer surface, whereby contraction of the tabs is prevented.

4. A method of preventing liner slippage within a lined vessel, the liner and the vessel having edge portions, including the steps of:
    forming tabs in said liner edge portion extending beyond said vessel edge portions,
    flaring said tabs radially outwardly,
    bending said tabs around the vessel edge portions, and retaining the tabs against the vessel thereby preventing their return to their pre-flared positions.

References Cited

UNITED STATES PATENTS 3,000,433    9/1961    Kemper _____ 138—147

FOREIGN PATENTS 1,005,103    4/1902    France.

PATRICK D. LAWSON, *Primary Examiner.*